United States Patent Office 3,188,939
Patented June 15, 1965

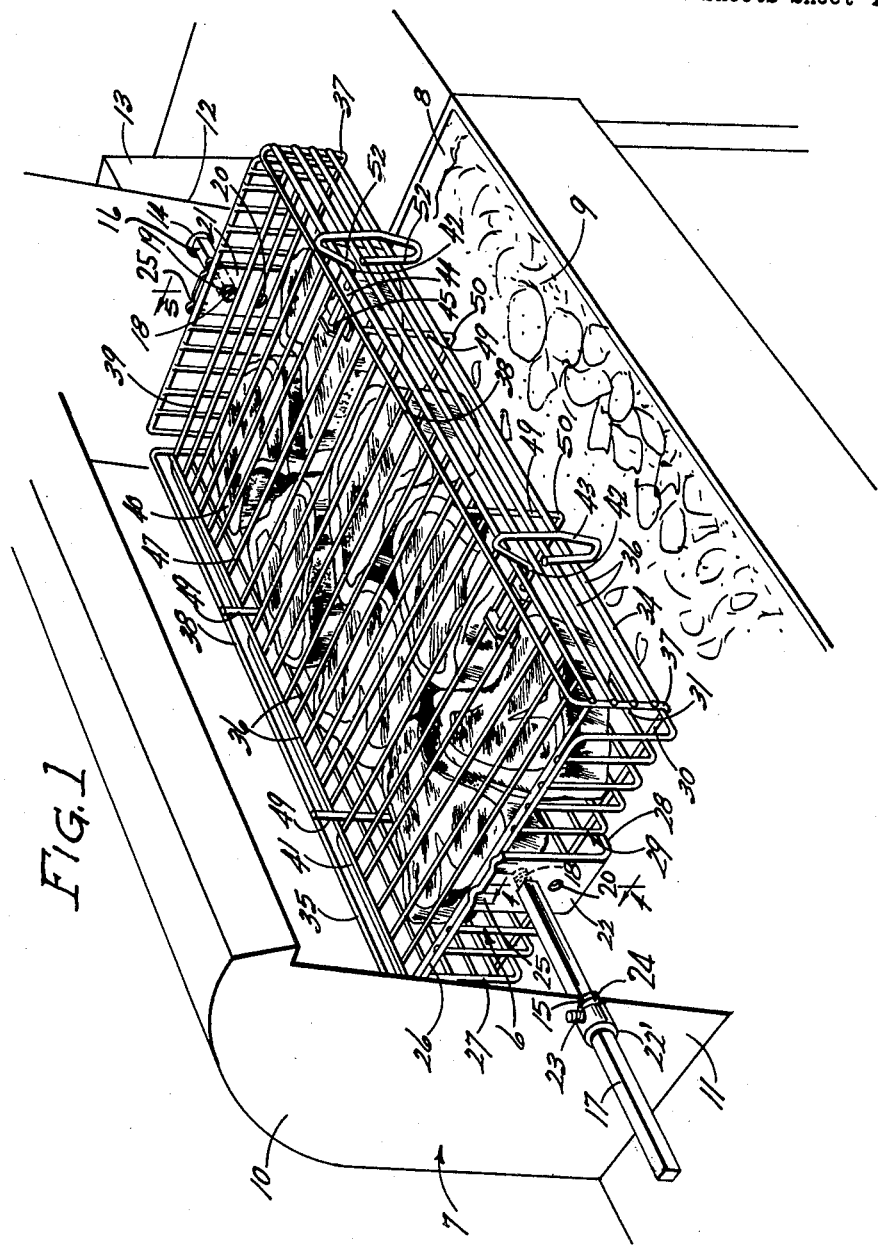

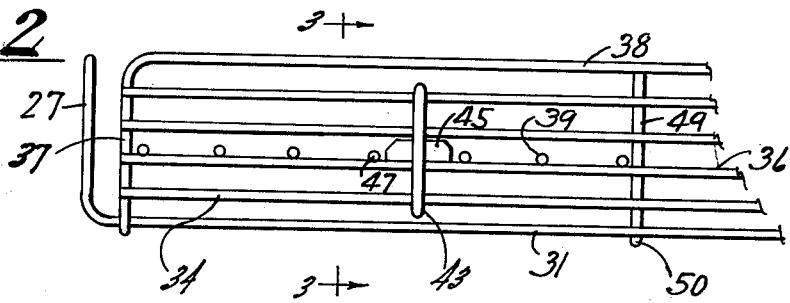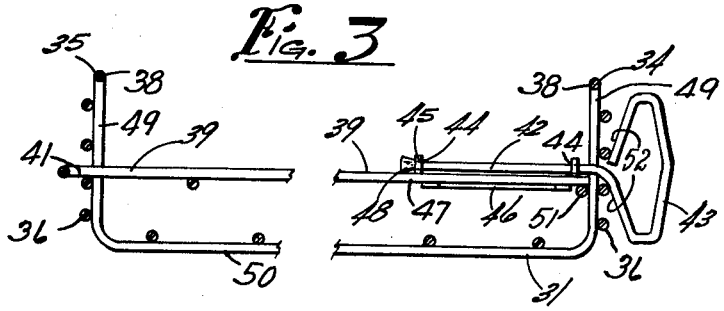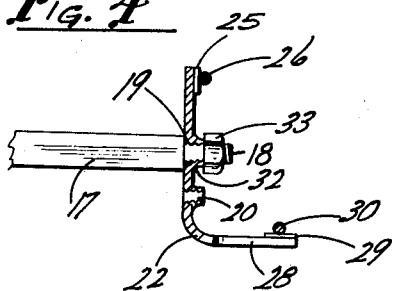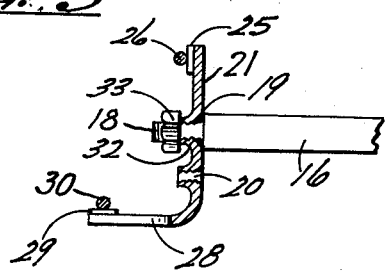

3,188,939
SPIT BASKET
Mahlon J. Smith, Niles, Mich., assignor to The Washburn Company, Worcester, Mass., a corporation of Massachusetts
Filed Dec. 26, 1962, Ser. No. 246,975
3 Claims. (Cl. 99—393)

This invention relates to a new and improved spit basket for use in outdoor barbecue grills for the uniform barbecuing of chops, steaks, hamburgers, cut-up chicken, spare ribs, frankfurters, fish, ears of corn, and other things.

The principal object of my invention is to provide an open top spit basket designed for quick and easy installation in an outdoor barbecue grill having a wire top closure panel insertable and detachably fastenable to the basket in any one of a plurality of settings at different levels with respect to the bottom of the basket to suit the thickness of the meat or other food to be barbecued, the top closure panel having turn-type fasteners of wire construction on one edge thereof having oppositely inclined surfaces on the projecting thumb-pieces or heads designed to have wedging engagement on the wires above and below the space through which these heads project, thereby springing the wires inwardly for an easier as well as a more secure fastening of the panel in any selected position.

The invention is illustrated in the accompanying drawings, in which:

FIG. 1 is a perspective view of an outdoor barbecue grill showing a spit basket made in accordance with my invention installed therein;

FIG. 2 is a fragmentary front view of the basket;

FIG. 3 is a cross-section on the line 3—3 of FIG. 2, and

FIGS. 4 and 5 are sectional details on the correspondingly numbered lines of FIG. 1.

The same reference numerals are applied to corresponding parts throughout the views.

Referring to the drawing, the reference numeral 6 designates the spit basket of my invention generally, and 7 designates an outdoor barbecue grill having the usual bottom box 8 for the charcoal fire, as indicated at 9, and a hood 10 having opposed upright end walls 11 and 12 in which the usual spit-bar is mounted for power operation at a predetermined low speed by means of the usual electric motor operated drive unit 13, the spit-bar being extended through a circular hole 14 in wall 12 for detachable connection with the drive unit and there being a slot 15 in the other wall 11 for entry and rotation of the free end of the spit-bar therein. The conventional spit-bar is dispensed with because I provide two adjustable square shafts 16 and 17 as parts of the basket assembly coaxially arranged with respect to one another at opposite ends of the basket 6 on the longitudinal center line thereof, these shafts having reduced threaded ends 18 adapted to be threaded in either of two holes 19 and 20 provided in vertically spaced relation to one another in angle plates 21 and 22 welded to the opposite ends of the basket, the upper holes 19 being used as here shown when the basket is full or nearly so, the lower holes 20 being used when the basket is only half full or has fairly thin meat in it. In that way, I can be more certain of the meat being cooked uniformly as there is less deviation of the basket as a whole and therefore of the meat in the basket from a certain elevation with respect to the bed of hot charcoals, and, at the same time I obtain a more nearly balanced condition so that less power is required in the operation of the spit basket and there is less noise and less wear and tear on the drive unit 13. The shaft 16, as shown, extends through and is rotatable in the hole 14 on wall 12 and has the usual detachable driving connection with the drive gear in the reduction gearing in drive unit 13. Shaft 17 has a bearing collar 22' slidably adjustably secured thereon by means of a set screw 23 and this collar has an annular groove 24 provided therein for rotary bearing engagement in slot 15. In this way, the spit basket is demountably supported for rotation and held against endwise displacement from a predetermined position, so that shaft 16 cannot become disconnected from the drive gear.

Referring to FIGS. 4 and 5, the angle plates 21 and 22 are secured by the welding of projections 25 at their upper ends to the cross-wire 26 on each end wall 27 of the basket, and the inwardly bent lugs 28 on the lower end of the plates 21 and 22 are welded by means of projections 29 to a cross-wire 30 at each end of the bottom 31 of the basket spaced inwardly from the upright end walls 27, thereby insuring all of the necessary strength and rigidity to enable mounting the basket on two end shafts and transmitting drive thereto through one of these shafts as herein disclosed. The sheet metal of the angle plates 21 and 22 is swedged inwardly at holes 19 and 20, as indicated at 32 in FIGS. 4 and 5, in order to provide the desired increased length of threads and increased length of bearing engagement of the reduced threaded ends 18 of shafts 16 and 17 in these holes requisite for strength and rigidity of these connections at both ends of the basket. The reduced threaded portions 18 are elongated sufficiently in relation to the swedged portions 32 so that there is enough of these reduced threaded end portions 18 projecting inside the angle plates 21 and 22 to permit application of nuts 33, which, when tightened against the swedged portions 32, serve to lock the threaded connections and minimize any likelihood of their loosening, this precaution being necessary, however, only in the few instances where the drive unit 13 is on the left-hand side of the broiler unit, in which event (assuming right-hand threads are provided) the drive is in the direction of unthreading the shaft from its connection with the angle plate 22, when, of course, the application of a lock-nut 33 at the threaded end of the shaft in the manner indicated in FIGS. 4 and 5 solves the problem. When, as herein shown, the drive unit 13 is on the right-hand side, the drive on shaft 16 is in the direction of tightening the threaded connection of the shaft with the angle plates 21 and there is then, of course, no real need for applying a lock-nut.

Coming now to the improved turn-type fasteners of my invention, provided in connection with the wire top closure on the basket, it will be noticed that the basket 6 per se has parallel upright front and rear walls 34 and 35 each with four vertically spaced horizontal wires 36 welded at their opposite ends to upright wires 37 provided by downwardly bent end portions of the top wire 38 on the front and back walls, thereby providing four different levels at which one can set the wire top closure panel 39, according to what space is needed between the panel 39 and the bottom 31 of the basket. In FIG. 1, the six thick chops indicated at 40 required a setting of the panel 39 in the next to the topmost position with the rear edge portion 41 of the panel 39 projecting through the rear wall 35 at the second level and with the shanks 42 of the two turn-type fasteners 43 extending through the front wall 34 at the same second level, the heads of said fasteners 43 being turned at right angles to the wires 36 to lock the panel 39 in place. Each of these turn-type fasteners 43 has the shank 42 rotatably mounted in aligned holes 44 provided in the upturned ends 45 of a generally rectangular plate 46 that is welded to the underside of two adjacent wires 47 extending from front to rear of the panel 39, the protruding inner end portion 48 of the shank 42 being flattened to provide an enlargement sufficient to prevent endwise displacement of the shank 42 from the holes 44 when there is a forward pull on the shank, as when the head of the fastener 43 is turned to right angle relationship to the wires 36. Upright wires 49 are welded in crosswise relationship to wires 36 and 38 on the front and rear walls 34 and 35, these upright wires being on the opposite ends of wires 50 that extend from front to rear of the bottom 31 of the basket and are welded thereto.

In operation, when the level for setting of the panel 39 has been selected according to the thickness of the meat 40, the rear edge portion of the panel 39 is slipped through the proper openings in the rear wall 35, and then the heads of fasteners 43, which are turned to parallel relationship to the panel 39, are slipped through corresponding openings in the front wall 34 of the basket and the front end 51 of the panel 39 is brought forward into engagement with the upright wires 49 and then the heads of fasteners 43 are turned at right angles to lock the panel 39 in place. In this turning of the fasteners 43 the oppositely inclined surfaces 52 on the back of their heads have wedging engagement on the wires 36 above and below the opening through which these heads project, thereby springing the end portions of the front wall 34 inwardly to some extent but mainly these wires 36 between the upright wires 37 and 49 for a quite secure fastening of the panel 39 in the selected setting. The amount of springing of the front wall 34 and of the wires 36 is, of course, well within their elastic limit so that there is no likelihood of these parts taking a set, and, of course, the spring pressure exerted by these wires against the heads of the fasteners 43 gives greater assurance that the heads will not be apt to turn to unlocked position accidentally in the rotation of the spit basket. When the basket is filled to capacity and panel 39 is entered in the top most openings under the top wire 38 in the front and rear walls 34 and 35, the same inward springing of the wires 36 and 38 occurs and the same good locking action is obtained. The shafts 16 and 17 are shown inserted in the upper holes 19, as best suits a full or nearly full basket for good balance. The shafts are inserted in the lower holes 20 when the basket is only half loaded or less. Juices baste the surfaces of the meat uniformly as the well balanced basket turns smoothly supporting the meat at a substantially constant level relative to the bed of hot charcoals. As a result, better tasting barbecued meat is obtained, because the meat is always cooked more nearly uniformly on both sides, a result not obtainable when the basket was mounted on a spit-bar attached to the bottom thereof.

It is believed the foregoing description conveys a good understanding of the objects and advantages of my invention. The appended claims have been drawn to cover all legitimate modifications and adaptations.

I claim:

1. A spit basket comprising a generally rectangular open top basket of wire construction having a bottom wall, and parallel opposed side walls with vertically spaced horizontal wires provided therein in parallel relationship to the bottom wall, a generally rectangular closure panel fitting loosely in said basket and adapted to be set at different elevations in substantially parallel relationship to the bottom wall by entry of one longitudinal edge portion in one side wall in a selected space between any two of the aforesaid vertically spaced wires, the other side wall having the vertically spaced horizontal wires made of flexible resilient wire, said side wall including means blocking passage of the other longitudinal edge portion of said panel therethrough, and a turn-type fastener mounted on the last named longitudinal edge portion of said panel for rotation on an axis substantially parallel to the plane thereof and substantially at right angles to said longitudinal edge portion, said fastener being extensible through any one of the spaces between the wires on the last named side wall and having a cross-head of flexible resilient wire loop construction which when extended from the basket and turned in transverse relationship to the last mentioned wires serves to retain the panel against displacement from its selected position spaced relative to the bottom wall, said cross-head having oppositely inclined surfaces defined by the flexible resilient wire on the inner side thereof on opposite sides of the axis thereof, said cross-head having wedging engagement between two flexible resilient horizontal wires on the wall of the basket above and below the level of the panel causing the wires on the basket and on the cross-head to flex relative to one another for more secure fastening of the panel.

2. A spit basket as set forth in claim 1 wherein the means blocking passage of the fastener carrying longitudinal edge portion of said panel comprises an upright wire disposed in transverse relationship to the vertically spaced horizontal wires in one of said side walls of said basket and secured thereto in spaced relationship to the fastener on said panel, the panel having abutment with said upright wire to prevent passage of the panel through the space between any neighboring pair of said horizontal wires, and the turn-type fastener serving when turned in transverse relationship to said horizontal wires to hold the panel in abutment with said upright wire.

3. A spit basket as set forth in claim 1 wherein the means blocking passage of the fastener carrying longitudinal edge portion of said panel through either of the side walls of said basket comprises upright wires in transverse relationship to the vertically spaced horizontal wires in both side walls of said basket and connected thereto, said upright wires being defined by upwardly bent ends of a horizontal wire on the bottom wall of said basket, the panel being insertable in the basket so that the fastener carrying longitudinal edge portion of said panel is arranged to have abutment with either of said upright wires to prevent passage of the panel through the space between horizontal wires in either of said side walls, and the turn-type fastener serving when turned in transverse relationship to said horizontal wires to hold the panel in abutment with whichever one of the upright wires is disposed adjacent said fastener.

References Cited by the Examiner

UNITED STATES PATENTS

| | | | |
|---|---|---|---|
| 53,419 | 3/66 | Crawford et al. | 24—221 |
| 630,675 | 8/99 | Ferral. | |
| 1,026,772 | 5/12 | Ries | 24—221 |
| 1,224,874 | 5/17 | Wolfe | 308—15 |
| 2,085,169 | 6/37 | Prood. | |
| 2,760,428 | 8/56 | Boyajian | 99—427 |
| 2,839,989 | 6/58 | Persinger | 99—421 |
| 2,895,408 | 7/59 | Glenny | 99—427 |
| 2,925,771 | 2/60 | Avetta. | |
| 2,983,218 | 5/61 | Persinger et al. | 99—427 |
| 3,085,500 | 4/63 | Russell | 99—427 |

ROBERT E. PULFREY, *Primary Examiner.*

GEORGE A. NINAS, Jr., JEROME SCHNALL, *Examiners.*